United States Patent [19]

Sugiyama et al.

[11] Patent Number: 4,801,035
[45] Date of Patent: Jan. 31, 1989

[54] PROTECTION COVER

[75] Inventors: Masaaki Sugiyama; Mitsugu Watanabe; Hideharu Hayashi; Yukio Nishio; Masaki Yamamoto, all of Kosai, Japan

[73] Assignee: Yazaki Corporation, Tokyo, Japan

[21] Appl. No.: 59,743

[22] Filed: Jun. 8, 1987

[30] Foreign Application Priority Data

Jun. 27, 1986 [JP] Japan .................. 61-97753[U]

[51] Int. Cl.[4] .................................. H02G 3/14
[52] U.S. Cl. ............................ 220/3.8; 220/72
[58] Field of Search ..................... 220/3.8, 72

[56] References Cited

U.S. PATENT DOCUMENTS

| 3,005,572 | 10/1961 | Gustafson et al. | 220/72 |
| 3,852,514 | 12/1974 | Lauben | 220/3.8 X |
| 4,131,932 | 12/1978 | Brumfield, Jr. et al. | 220/3.8 X |
| 4,381,063 | 4/1983 | Leong | 220/3.8 X |

Primary Examiner—Steven M. Pollard
Attorney, Agent, or Firm—Armstrong, Nikaido, Marmelstein & Kubovcik

[57] ABSTRACT

A protection cover for a wiring distribution box in which rising walls are continuously or discontinuously formed around a label bonding position.

2 Claims, 3 Drawing Sheets 4,801,035

PROTECTION COVER

BACKGROUND OF THE INVENTION

1. Field of the Invention

This invention relates to a protection cover of a wiring distribution box in automobiles or the like for accommodating electrical components and wire harness to be interconnected.

2. Description of The Prior Art

A wiring distribution box to be carried on an automobile is normally disposed in an engine room and a protection cover is provided on the distribution box to keep out dust, water or oil etc. causing troubles, and to protect the wirings and others in the box from damages due to collision with external assemblies.

Such wiring distribution boxes are often bonded so called caution labels showing constructions and functions and the upper surface of the protection cover a is usually selected as a bonding position as shown in FIG. 9. The temperature in engine rooms varies in a wide range and causes bonding agents to age. And therefore the label may come off partly when it collides with other articles around or the engine room is washed with high-pressure water.

Peeling-off or turning up of labels often makes it difficult to read what the labels say.

SUMMARY OF THE INVENTION

It is an object of the present invention to provide a means for preventing labels from peeling off while using the same conventional types of bonding agents.

The above-mentioned object is achieved by providing a rising wall, continuous or discontinuous, around the label bonding position on the protection cover of the wiring distribution box. Since the label bonding position described above is normally located on the upper surface of the protection cover, the rising wall surrounding the label can be in the form of ribs formed along the contour of the label or alternatively the label-bonding position can be recessed from its periphery.

If the rising wall is formed continuously around entire periphery of the label, water, oil etc. may be left therein and therefore it is practical to provide one or more cutouts for drainage of water, oil etc.

The rising walls surrounding the label can work to keep out lateral external force, which will have been exerted, if the walls were not provided, to the label edge which is no longer firmly bonded due to aged bonding agent. Thus the rising walls prevent the label from coming off or partially turning up.

Other and further objects, features and advantages of the invention will appear more fully from the following description.

DETAILED DESCRIPTION OF THE PREFERRED EMBODIMENTS

The preferable embodiments of the present invention will be described in detail with reference to FIGS. 1 to 8.

Embodiment 1

Figure 1:
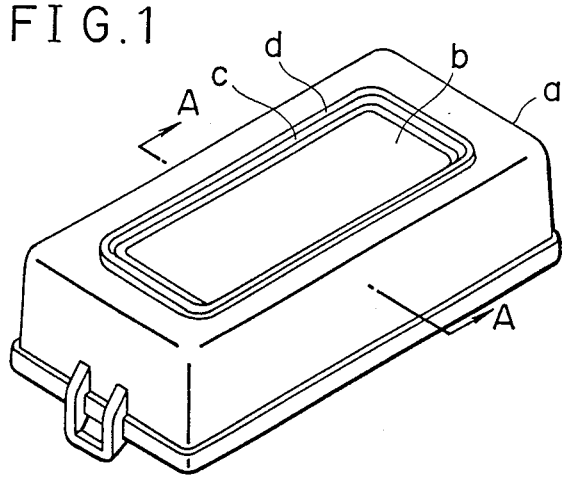
FIG. 1 is a perspective view showing an embodiment of a protection cover according to the present invention.
Figure 2:
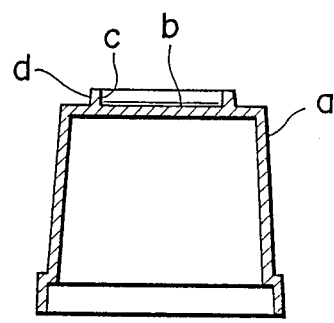
FIG. 2 is a sectional view of the protection cover taken along the line A—A of FIG. 1.

FIGS. 1 and 2 show an embodiment of a protection cover according to the present invention.

Figure 3A:
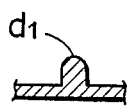
FIGS. 3a and 3b are sectional views of ribs of different shapes.
Figure 3B:

A rib d which surrounds the periphery of a protection cover a is formed at the periphery of the bonding position of a label b on the upper surface of the protection cover a, and the inside of the rib d becomes a wall c. Although the cross section of the rib d shown in the form of a rectangle, it may also be in the form of a semicircle d1 or of a triangle d2 as shown in FIG. 3a and 3b.

Embodiment 2

Figure 4:
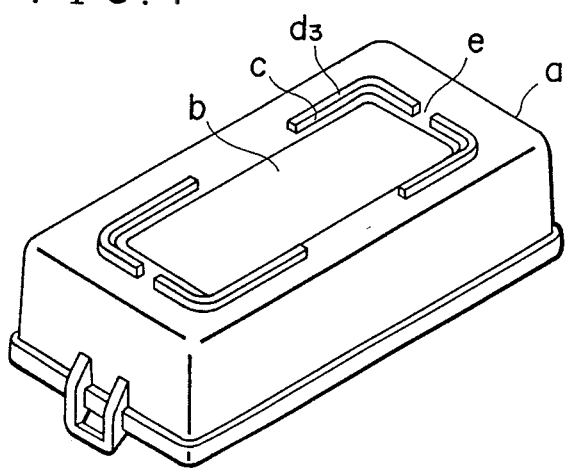
FIG. 4 is a perspective view of another embodiment of a protection cover according to the present invention.

FIG. 4 shows another embodiment of a protection cover a formed with ribs d3 divided by cutouts e so that water can escape from the label bonding position rather than being trapped in the area.

Embodiment 3

Figure 5:
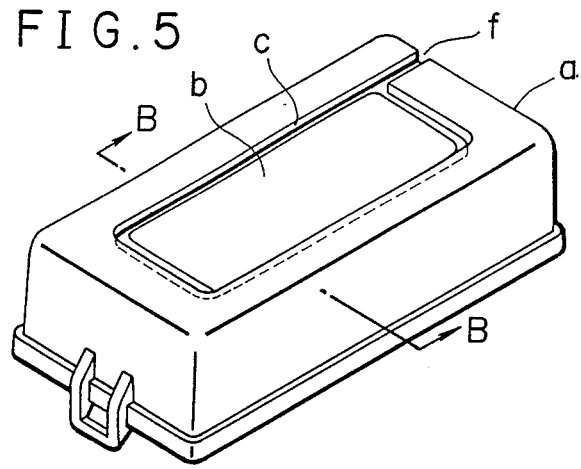
FIG. 5 is a perspective view of still another embodiment of a protection cover according to the invention.
Figure 6:
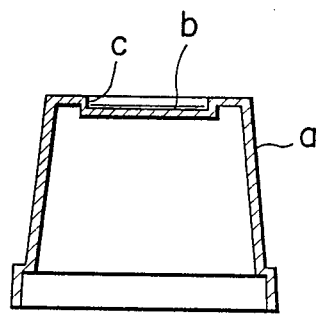
FIG. 6 is a sectional view of the protection cover taken along the line B—B of FIG. 5.

FIGS. 5 and 6 show still another embodiment of a protection cover a in which the bonding position of a label b is recessed. A drain groove f for water escape is formed outwardly at one corner of the recess and the peripheral rising wall c is discontinuous at the groove f.

Embodiment 4

Figure 7:
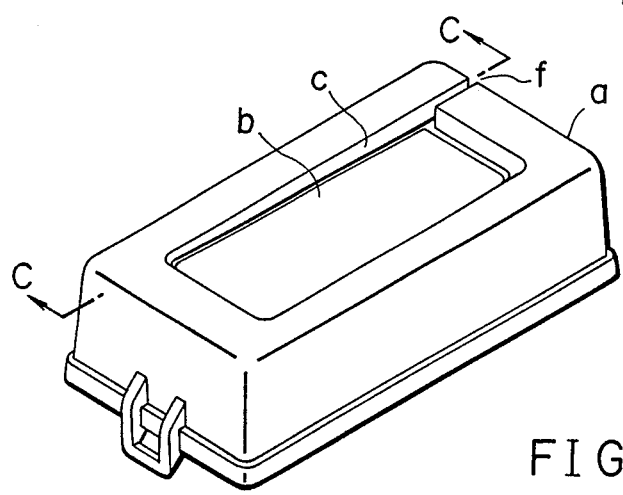
FIG. 7 is a perspective view of still another embodiment of a protection cover of the invention.
Figure 8:
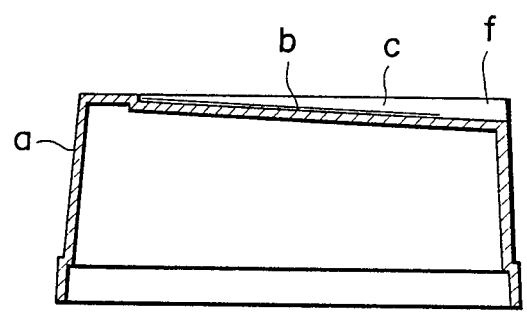
FIG. 8 is a sectional view of the protection cover taken along the line C—C in FIG. 7.
Figure 9:
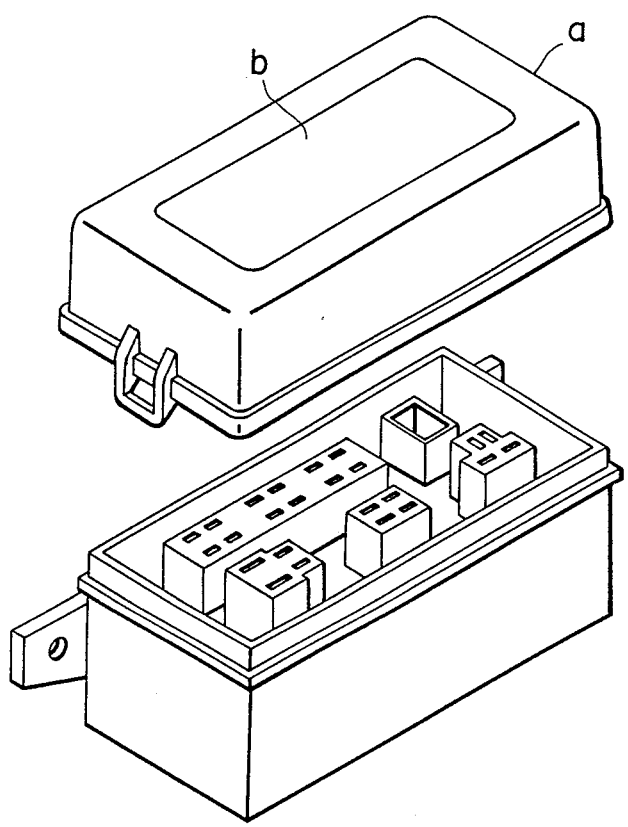
FIG. 9 is a perspective view of a conventional wiring distribution box and its protection cover.

FIGS. 7 and 8 show still another embodiment of a protection cover a in which the construction is formed in the same manner as the embodiment 3 except that the bonding surface of a label b is inclined in one direction.

Since the protection cover of this invention can be utilized not only for a wiring distribution box but for similar objects and is formed with the rising wall continuously or discontinuously around the label bonding position, even if it is washed with high pressure water or is collided with an external article, the edges of the label are protected against separation or partially turning-up. Since the bonding position is clearly defined by the walls, the bonding work can be readily performed.

What is claimed is:

1. A protective cover for an automotive part to be stored in an automobile engine compartment, said cover comprising an upper surface having a generally planar area, a label applied to the upper surface in the generally planar area, said generally planar area being recessed in the upper surface a depth substantially equal to the label thickness, and at least one drain groove means in the unrecessed portion of the upper surface for permitting water to escape from the generally planar area.

2. A protective cover for an automotive part to be stored in an automobile engine compartment, said cover comprising an upper surface having a generally planar area, a label having sides applied to the upper surface in the generally planar area, the upper surface having ridges at least partly surrounding the circumferential edge of the label and extending on each side thereof and having a heigh substantially equal to the thickness of the label, said ridges having at least one cutout means for permitting water to escape from the generally planar area.

* * * * *